US010017419B2

(12) United States Patent
Tardy et al.

(10) Patent No.: US 10,017,419 B2
(45) Date of Patent: Jul. 10, 2018

(54) COMPOSITE FIBER FOR THE REINFORCEMENT OF CONCRETE

(71) Applicant: OCV Intellectual Capital, LLC, Toledo, OH (US)

(72) Inventors: Gerard Tardy, Sonnaz (FR); David Blandin, La Ravoire (FR); Daniel Gil, Jacob-Bellecombette (FR); Benoit Lorre, Saint-Sulpice (FR); Olivier Laurence, Vertou (FR); Bryan Barragan, Chambery (FR)

(73) Assignee: OCV Intellectual Capital, LLC, Toledo, OH (US)

( * ) Notice: Subject to any disclaimer, the term of this patent is extended or adjusted under 35 U.S.C. 154(b) by 0 days.

(21) Appl. No.: 15/602,522

(22) Filed: May 23, 2017

(65) Prior Publication Data

US 2017/0253527 A1    Sep. 7, 2017

Related U.S. Application Data

(62) Division of application No. 14/916,231, filed as application No. PCT/US2014/053655 on Sep. 2, 2014, now abandoned.

(60) Provisional application No. 61/873,444, filed on Sep. 4, 2013.

(51) Int. Cl.
| | | |
|---|---|---|
| C08K 9/08 | (2006.01) | |
| C04B 20/10 | (2006.01) | |
| C04B 28/02 | (2006.01) | |
| C04B 18/02 | (2006.01) | |
| C04B 20/00 | (2006.01) | |
| B05D 3/06 | (2006.01) | |
| C04B 14/38 | (2006.01) | |

(52) U.S. Cl.
CPC .......... *C04B 20/1014* (2013.01); *B05D 3/065* (2013.01); *C04B 14/38* (2013.01); *C04B 18/022* (2013.01); *C04B 20/0068* (2013.01); *C04B 20/1037* (2013.01); *C04B 28/02* (2013.01)

(58) Field of Classification Search
CPC .. C04B 20/1014; C04B 14/38; C04B 20/0068
See application file for complete search history.

(56) References Cited

U.S. PATENT DOCUMENTS

| | | | | |
|---|---|---|---|---|
| 2003/0219580 | A1* | 11/2003 | Tagge | C04B 18/28 428/292.1 |
| 2007/0231502 | A1* | 10/2007 | Jones | C08J 7/047 427/532 |
| 2015/0166830 | A1 | 6/2015 | Tardy et al. | |
| 2016/0194246 | A1 | 7/2016 | Tardy et al. | |

FOREIGN PATENT DOCUMENTS

| | | |
|---|---|---|
| CN | 2711249 | 7/2005 |
| CN | 1910326 | 2/2007 |
| CN | 102712531 | 10/2012 |
| DE | 102011087367 A1 | 5/2013 |
| JP | 2002154853 A | 5/2002 |
| WO | 02/00566 A1 | 1/2002 |
| WO | 02/076904 A2 | 10/2002 |
| WO | 06/059041 A1 | 6/2006 |

OTHER PUBLICATIONS

Machine translation of JP 2002/154853 (2002).*
Office Action for European Patent Application No. 14766322.3 dated Dec. 14, 2017.
Office Action for Chinese Patent Application No. 201480056079.8 dated Feb. 11, 2018.
Office action from Chinese Application No. 201480056079.8 dated Jan. 5, 2017.
Office action from U.S. Appl. No. 14/916,231 dated Feb. 23, 2017.
Office action from U.S. Appl. No. 14/916,231 dated Oct. 24, 2016.
Office action from European Application No. 14766322.3 dated May 8, 2017.
Office action from Australian Application No. 2014315442 dated Jul. 7, 2017.
Office action from Chinese Application No. 201480056079.8 dated Aug. 11, 2017.
International Preliminary Report on Patentability from PCT/US2014/053655 dated Mar. 8, 2016.
International Search Report and Written Opinion from PCT/US2014/053655 dated Dec. 15, 2014.

* cited by examiner

Primary Examiner — Hannah J Pak
(74) Attorney, Agent, or Firm — Calfee, Halter & Griswold LLP

(57) ABSTRACT

Composite fibers and methods of manufacturing composite fibers for the reinforcement of concrete are provided. The composite fibers include fibers and a polymeric coating. The composite fibers have a length of about 10 mm to about 80 mm and an equivalent diameter from about 0.3 mm to about 2 mm. A method for reinforcing concrete using the composite fibers is further provided.

9 Claims, No Drawings

COMPOSITE FIBER FOR THE REINFORCEMENT OF CONCRETE

CROSS-REFERENCE TO RELATED APPLICATIONS

This application is a divisional of U.S. application Ser. No. 14/916,231, filed Mar. 3, 2016, which is the U.S. national stage entry of International Application No. PCT/US2014/053655, filed Sep. 2, 2014, which claims priority to and the benefit of U.S. Provisional Patent Application No. 61/873,444, filed on Sep. 4, 2013, the entire disclosures of which are fully incorporated herein by reference.

FIELD

The general inventive concepts relate to composite fibers for the reinforcement of concrete, a process of manufacturing and a way of reinforcing concrete and other building materials using such fibers.

BACKGROUND

Building materials such as concrete can be reinforced with fibers in order to overcome specific issues that can arise when using conventional reinforcement members, such as steel rebars and/or welded wire mesh. Fibers can introduce toughness (i.e., energy absorption capacity during failure) to concrete, overcoming its intrinsic brittleness and providing post-cracking strength under direct or indirect tensile stresses. The vast majority of conventional fibers used for reinforcing concrete reinforcement are made out of low or high carbon content steel, or polymers such as polypropylene, polyvinyl alcohol, polyester, etc. These conventional fibers suffer from limitations. Processability issues can be generated by the relatively high dosages required (such as clustering during mixing, blockings during pumping, reduction of workability, and difficult compaction and finishing). Additionally, the cost-performance benefit of such conventional fibers is often less than that of traditional solutions due to the relatively high dosages required; durability concerns; health, safety, and environment problems; etc. Composite reinforcing materials, such as composite fibers, can overcome the shortcomings of conventional fibers; i.e., by achieving a very high performance at relatively low dosages.

JP2002154853A1 describes composite fibers produced by impregnating a continuous inorganic fiber bundle with a resin, hardening the resulting material and thereafter cutting the hardened material. The resin content of this composite fiber is 10 to 80 mass %. Its length is 10 to 80 mm and its cross section is 0.1 to 12 mm.

WO2006059041 A1 discloses composite fibers or composite tapes based on co-melted glass fibers and polypropylene fibers, such as the composite products sold under the Twintex® brand (available from Owens Corning) and manufactured by thermoplastic pultrusion.

However, these known composite fibers suffer from the problem of relatively high production costs. Key to production cost is the production rate. For example, JP2002154853A1 describes line speeds of only 5 meters/minute.

Higher production rates can be achieved by using radiation curing technology. U.S. Pat. No. 4,861,621, incorporated herein by reference, discloses a pultrusion process which cures materials by ultraviolet radiation for optic cable applications. Specifically, a reinforcing filamentary material, in the form of a glass roving, is impregnated with a curable coating material and then passed underneath a unit for UV radiation. The pultrusion speed is 10 meters/minute (Example 2).

Other UV curing processes are known in the art. However, there remains a need in the art for solutions for the reinforcement of concrete that overcome the drawbacks mentioned above, particularly solutions that improve the production rate of composite fibers, which will in turn lower the manufacturing costs.

SUMMARY

The general inventive concepts refer to composite fibers used in the reinforcement of concrete. The composite fibers comprise a plurality of fibers coated with a polymeric material. Required dosages of the composite fibers allow for better processability of concrete and provide high toughness or post-cracking strength up to large crack openings while involving low manufacturing costs.

In some exemplary embodiments, the composite fibers are characterized in that the length of the composite fiber is from 10 to 80 mm and the equivalent diameter of the composite fiber is from 0.3 to 2 mm.

In other exemplary embodiments, the polymeric coating is a radiation (e.g., UV) cured polymeric coating.

In other exemplary embodiments, the polymeric coating is from 5 to 50 wt % of the composite fiber.

The general inventive concepts further relate to methods of manufacturing a composite fiber. In some exemplary embodiments, the method includes preparing a liquid polymeric coating composition; applying the liquid polymeric coating composition to the surface of a plurality of fibers to form a coated surface; and exposing the coated surface to radiation and curing the liquid coating composition to form a composite fiber.

The general inventive concepts further relate to methods of forming reinforced concrete. The method includes the steps of preparing a concrete and mixing one or more composite fibers of the invention in that concrete, forming reinforced concrete.

In other exemplary embodiments, the dosage of composite fibers in the applied concrete is from 2 to 75 kg of fibers per cubic meter of wet concrete.

In other exemplary embodiments, the dosage of composite fibers in the applied concrete is from 5 to 25 kg of fibers per cubic meter of wet concrete.

In other exemplary embodiments, the dosage of composite fibers in the applied concrete is from 7.5 to 12.5 kg of fibers per cubic meter of wet concrete.

Additional features and advantages will be set forth in part in the description that follows, and in part may be obvious from the description, or may be learned by practice of the exemplary embodiments disclosed herein. The objects and advantages of the exemplary embodiments disclosed herein will be realized and attained by means of the elements and combinations particularly pointed out or otherwise recited in the appended claims. It is to be understood that both the foregoing summary and the following detailed description are exemplary and explanatory only and are not restrictive of the general inventive concepts as disclosed herein or as claimed.

DETAILED DESCRIPTION

Various exemplary embodiments will now be described more fully. These exemplary embodiments may, however, be embodied in different forms and should not be construed as limited to the descriptions set forth herein. Rather, these exemplary embodiments are provided so that this disclosure will be thorough and complete in illustrating and conveying the general inventive concepts to those skilled in the art.

Unless otherwise defined, all technical and scientific terms used herein have the same meaning as commonly understood by one of ordinary skill in the art to which these exemplary embodiments belong. The terminology used in the description herein is for describing particular exemplary embodiments only and is not intended to be limiting of the general inventive concepts.

As used in the specification and the appended claims, the singular forms "a," "an," and "the" are intended to include the plural forms as well, unless the context clearly indicates otherwise. All publications, patent applications, patents, and other references mentioned herein are incorporated by reference in their entirety.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present exemplary embodiments. At the very least, and not as an attempt to limit the application of the doctrine of equivalents to the scope of the claims, each numerical parameter should be construed in light of the number of significant digits and ordinary rounding approaches.

Notwithstanding that the numerical ranges and parameters setting forth the broad scope of the exemplary embodiments are approximations, the numerical values set forth in the specific examples are reported as precisely as possible. Any numerical value, however, inherently contains certain errors necessarily resulting from the standard deviation found in their respective testing measurements. Every numerical range given throughout this specification and the claims will include every narrower numerical range that falls within such broader numerical range, as if such narrower numerical ranges were all expressly written herein.

As used herein, "fiber" means a collection of one or more monofilaments.

As used herein, "polymeric coatings" means a mixture of monomers and/or oligomers that are hardened by one of the curing methods described or otherwise suggested herein. herebelow.

As used herein, "impregnated" means partially or fully impregnated.

As used herein, "radiation cured" means that the monomers have been polymerized with the help of radiation preferably in presence of a suitable catalyst.

As used herein, UV cured means polymerization of the monomers in presence of UV radiation.

As used herein, the term "polymer" includes the term "copolymer," and, unless otherwise indicated, the term "copolymer" refers to polymers made from any two or more different monomers, including, for example, terpolymers, pentapolymers, homopolymers functionalized after polymerization so that two or more different functional groups are present in the product copolymer, block copolymers, segmented copolymers, graft copolymers, and any mixture or combination thereof. As used herein, "(co)polymer" means homopolymer or copolymer.

As used herein "composite fiber" means a collection of one or more fibers coated with a polymeric material.

As used herein, "equivalent diameter" means diameter as defined in EN14889 Standard.

As used herein, "aspect ratio" means a length-to-diameter ratio as defined in EN14889 Standard.

As used herein, "concrete" means any type of building material containing aggregates embedded in matrix (the cement or binder) that fills the space among the aggregate particles and glues them together e.g. Portland Cement based concrete, mineral mortar but also asphalt.

In accordance with various exemplary embodiments, composite fibers are provided for the reinforcement of concrete. The length of the composite fibers may be from about 10 to about 80 mm. The equivalent diameter of the composite fibers may be from about 0.3 to about 2 mm. In other exemplary embodiments, the length of the composite fibers is from about 30 to about 50 mm and the equivalent diameter of the composite fibers is from about 0.5 to about 1.0 mm.

The shape of the composite fiber may vary. In some exemplary embodiments the composite fibers are generally cylindrical or ellipsoidal. Additionally, the surface of the composite fibers may vary, such as from smooth to rough or embossed.

In certain exemplary embodiments, the fiber is an inorganic fiber, such as a glass or other mineral fiber. Non-exclusive exemplary glass fibers include A-type glass fibers, C-type glass fibers, G-type glass fibers, E-type glass fibers, S-type glass fibers, E-CR-type glass fibers (e.g., Advantex® glass fibers commercially available from Owens Corning), R-type glass fibers, biosoluble glass fibers, alkali-resistant glass, or combinations thereof, all of which may be suitable for use as the reinforcing fiber. In some exemplary embodiments, an alkali-resistant glass fiber, such as Cemfil® available from Owens Corning, is suitable for use as the reinforcing fiber.

The diameter of the monofilaments forming the fiber may vary from about 10 to about 27 microns, or from about 13 to about 20 microns.

The tex of the fibers may be from 300 to 2400 tex. In some exemplary embodiments, the tex is in the range of 400 to 1200 tex.

According to various exemplary embodiments, at least 50% of the surface of the filaments is impregnated with a polymeric coating. In other exemplary embodiments, up to 95% of the surface of the filaments is impregnated with the polymeric coating. The polymeric coating may be a radiation cured polymeric coating, such as, for example, a UV cured polymeric coating. A wide range of radiation, and in particular UV curable monomers, oligomers or polymers, are known in the art. Particularly suitable UV curable monomers, oligomers or polymers include acrylates, methacrylates, vinylethers and vinyl derivatives based on polyurethane, epoxy, polyester, polyether structures with or without aliphatic or aromatic backbones, and copolymers based on such structures. In some exemplary embodiments, the polymeric coating includes polyurethanes based on aromatic structure, alone or in a mixture with epoxy or polyether derivative. In some exemplary embodiments, the polymeric coating is a polyurethane resin.

The polymeric coating may comprise about 5 to about 50 wt %, of the composite fiber. In some exemplary embodiments, the polymeric coating is from about 10 to about 30 wt % of the composite fiber.

The exemplary composite fibers described herein may be manufactured using any suitable type of fiber, such as, for example, a glass fiber. A liquid, or otherwise viscous, monomeric or oligomeric coating composition may be prepared and applied to the surface of the fiber, forming a coated element. In some exemplary embodiments, the polymeric coating comprises a polyester or vinylester. The coated element may then be exposed to radiation, such as UV radiation, which cures the coating composition to form a composite fiber.

In some exemplary embodiments, the composite fibers described herein may be used to reinforce concrete. The reinforced concrete may be formed by preparing a concrete (e.g., using a conventional method of forming concrete) followed by mixing the composite fibers into the concrete, thereby forming a composite fiber reinforced concrete. In some exemplary embodiments, the dosage of composite fibers in the reinforced concrete is from about 2 to about 75 kg of fiber per cubic meter of concrete, or from about 5 to about 25 kg of fiber per cubic meter of concrete. In some exemplary embodiments, the dosage of composite fibers in the reinforced concrete is from about 7.5 to about 12.5 kg of fiber per cubic meter of concrete.

Thus, the general inventive concepts also encompass using the composite fibers for the reinforcement of concrete or other building materials.

The composite fibers have a combination of particular dimensions that result in a surprisingly good performance in the reinforcement of concrete while showing a surprisingly good workability in the process of manufacturing concrete. This workability performance is evaluated through the Slump test, as defined in EN12350-2 Standard.

Other advantages of the composite fibers described herein include a high speed of dispersion during the mixing process, ease in achieving a uniform distribution of fibers in the concrete mass, reduced wearing of mixing and pumping systems, less risk of clogging pumping pipes and blockings when filling structural elements, and less risk of honeycombs and consequent durability issues when used in combination with conventional reinforcement.

The composite fibers are also safe for handling by workers. Exemplary reasons for this safety include the low weight of the composite fiber and the nonexistence of any sharp pins.

In some exemplary embodiments, the composite fibers do not corrode and, hence, do not develop corrosion stains in case of exposed concrete surfaces. Additionally, the composite fibers make the hardened concrete easier to recycle, as compared to traditional steel fibers.

Moreover, the manufacturing process of the composite fibers leads to low or reduced manufacturing costs. The process is flexible and adaptable to fit in with other stages in a continuous production line. For instance, the line speed may be easily varied to accommodate overall production variations. Additionally, the coating is immediately functional and able to be handled and requires no post-heating or drying. In that respect, the process allows for line speeds that can reach over 50 m/min, such as, for example, over 100 m/min.

The general inventive concepts have been described above both generally and with regard to various specific exemplary embodiments. Although the general inventive concepts have been set forth in what are believed to be exemplary illustrative embodiments, a wide variety of alternatives will be apparent to those of skill in the art from reading this disclosure. The general inventive concepts are not otherwise limited, except for those instances when presented in specific claims. Additionally, the following examples are meant to better illustrate the present invention, but do not limit the general inventive concepts.

EXAMPLES

The following examples describe the performance of various exemplary embodiments of the composite fibers of the present invention, as used for concrete reinforcement. Composite fibers were prepared with Cemfil® glass fibers available from Owens Corning and polyester resin standard cured using UV radiation. Resin content was 20 wt % of the composite fiber. The consistency or workability of the fresh concrete was measured according to the EN 12350-2 Standard. This test is reflected in the tables below as the Slump measurement. The flexural performance of hardened concrete was measured according to the EN 14651 after 28 days of standard curing (i.e., 20° C. and 100% relative humidity). The concrete compressive strength measured according to the EN 12390-3 standard was 30 MPa.

In the tables below, LOP refers to the limit of proportionality, which corresponds to the flexural tensile strength at the first crack produced. The residual flexural tensile strengths are reflected as $f_{R1}$ and $f_{R3}$.

Example 1: Influence of Equivalent Diameter and Aspect Ratio on the Performance

Dosage of the fiber was 10 kg fiber per cubic meters of concrete. Length of the composite fiber was 40 mm. The manufacturing speed of the composite fibers was 200 meters/min. Table 1 shows the influence of the equivalent diameter and aspect ratio of the composite fiber on performance.

TABLE 1

Impact of the equivalent diameter of the composite fiber on performance

| Equivalent diameter (mm) | Slump (cm) | LOP (MPa) | $f_{R1}$ (MPa) | $f_{R3}$ (MPa) |
| --- | --- | --- | --- | --- |
| 0.40 | 8 | 3.86 | 1.36 | 0.69 |
| 0.60 | 12 | 3.65 | 1.97 | 2.13 |
| 0.70 | 17 | 3.72 | 2.77 | 2.73 |

Example 2: Influence of Fiber Length on Performance

Dosage of the fiber was 10 kg of fiber per cubic meters of concrete. The equivalent diameter of the composite fiber was 0.70 mm. The composite fiber manufacturing speed was 200 meters/min. Table 2 shows the influence of the length and aspect ratio of the composite fiber on performance.

TABLE 2

Influence of the length of the composite fiber on performance

| Length (mm) | Slump (cm) | LOP (MPa) | $f_{R1}$ (MPa) | $f_{R3}$ (MPa) |
| --- | --- | --- | --- | --- |
| 25 | 25 | 3.94 | 2.18 | 1.73 |
| 40 | 17 | 3.72 | 2.77 | 2.73 |

Example 3: Influence of Resin Content on Performance

Dosage of the fiber was 10 kg of fibers per cubic meters of concrete. The length of the composite fiber was 40 mm and its equivalent diameter was 0.7 mm. The manufacturing speed of the composite fiber was 200 m/min. Table 3 shows the influence of the resin and aspect ratio of the composite fiber on performance.

TABLE 3

Influence of the resin content of the composite fiber on performance

| Resin content (%) | Equivalent Diameter (mm) | Slump (cm) | LOP (MPa) | $f_{R1}$ (MPa) | $f_{R3}$ (MPa) |
|---|---|---|---|---|---|
| 20 | 0.70 | 17 | 3.72 | 2.77 | 2.73 |
| 24 | 0.72 | 22 | 3.97 | 2.83 | 2.91 |

Example 4: Influence of the Dosage on the Performance

Length of the composite fiber was 40 mm and its equivalent diameter was 0.70 mm. Line speed was 200 m/min. Table 4 shows the influence of different dosages on performance.

TABLE 4

Influence of the dosage on the performance

| Dosage (kg/m3) | Slump (cm) | LOP (MPa) | $f_{R1}$ (MPa) | $f_{R3}$ (MPa) |
|---|---|---|---|---|
| 7 | 22 | 3.68 | 1.9 | 1.91 |
| 10 | 17 | 3.72 | 2.77 | 2.73 |

Example 5: Influence of the Line Speed on the Performance

Dosage of the fiber was 10 kg of fiber per cubic meter of concrete. Length of the composite fiber was 40 mm and its equivalent diameter was 0.70 mm. Table 5 shows the influence of different line speeds on performance.

TABLE 5

Influence of the line speed on performance (impregnation quality)

| Line speed (m/min) | Slump (cm) | LOP (MPa) | $f_{R1}$ (MPa) | $f_{R3}$ (MPa) |
|---|---|---|---|---|
| 100 | 19 | 3.92 | 2.58 | 2.78 |
| 200 | 17 | 3.72 | 2.77 | 2.73 |
| 280 | 14 | 3.85 | 2.17 | 1.78 |

The invention claimed is:

1. A method of reinforcing concrete, said method comprising:
   preparing a viscous polymeric coating composition;
   applying the viscous polymeric coating composition to a plurality of fibers to form a plurality of coated elements, each of said coated elements including one or more of said fibers;
   exposing the coated elements to radiation which cures the viscous polymeric coating composition to form a plurality of composite fibers;
   preparing a concrete; and
   mixing the composite fibers in said concrete,
   wherein said composite fibers are included in the concrete in an amount from 2 kg/m$^3$ to 75 kg/m$^3$ of said concrete.

2. The method of claim 1, wherein said radiation is ultraviolet radiation.

3. The method of claim 1, wherein said composite fibers have an equivalent diameter of 0.3 mm to 2 mm.

4. The method of claim 1, wherein the viscous polymeric coating composition comprises at least one of a polyurethane, a polyester, and a vinylester.

5. The method of claim 1, wherein the fibers comprise glass fiber.

6. The method of claim 1, wherein the viscous polymeric coating composition is from 5 wt % to 50 wt % of the composite fiber.

7. The method of claim 1, wherein the viscous polymeric coating composition is from 10 wt % to 30 wt % of the composite fiber.

8. The method of claim 1, wherein said composite fibers are included in the concrete in an amount from 5 kg/m$^3$ to 25 kg/m$^3$ of said concrete.

9. The method of claim 1, wherein said composite fibers have a length of 10 mm to 80 mm and an equivalent diameter from 0.3 mm to 2 mm.

* * * * *